(12) United States Patent
Kang et al.

(10) Patent No.: US 9,094,963 B2
(45) Date of Patent: Jul. 28, 2015

(54) METHOD AND SYSTEM FOR HANDLING UPLINK RESOURCE REQUEST IN WIRELESS COMMUNICATION SYSTEM

(71) Applicant: Samsung Electronics Co. Ltd., Suwon-si, Gyeonggi-do (KR)

(72) Inventors: Hyun-Jeong Kang, Seoul (KR); Rakesh Taori, Suwon-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 13/835,756

(22) Filed: Mar. 15, 2013

(65) Prior Publication Data

US 2013/0242907 A1    Sep. 19, 2013

(30) Foreign Application Priority Data

Mar. 15, 2012   (KR) .................. 10-2012-0026501

(51) Int. Cl.
    *H04W 72/04*   (2009.01)
(52) U.S. Cl.
    CPC ...... *H04W 72/0413* (2013.01); *H04W 72/0426* (2013.01)
(58) Field of Classification Search
    CPC ..................... H04W 72/0413; H04W 72/1284
    USPC .......................................... 370/329, 328, 252
    See application file for complete search history.

(56) References Cited

U.S. PATENT DOCUMENTS

| | | | |
|---|---|---|---|
| 7,792,533 B2 * | 9/2010 | Grandblaise et al. | 455/450 |
| 8,582,514 B2 * | 11/2013 | Moberg et al. | 370/329 |
| 2007/0054667 A1 * | 3/2007 | Lee et al. | 455/434 |
| 2008/0123585 A1 * | 5/2008 | Granzow et al. | 370/320 |
| 2009/0046641 A1 | 2/2009 | Wang et al. | |
| 2009/0285088 A1 * | 11/2009 | Feng et al. | 370/216 |
| 2010/0067495 A1 * | 3/2010 | Lee et al. | 370/335 |
| 2010/0157901 A1 * | 6/2010 | Sanderovitz et al. | 370/328 |
| 2010/0246548 A1 * | 9/2010 | Bahng et al. | 370/338 |
| 2011/0002275 A1 | 1/2011 | Shousterman | |
| 2011/0128916 A1 * | 6/2011 | Kwon et al. | 370/328 |
| 2012/0003962 A1 * | 1/2012 | Jeon et al. | 455/411 |

FOREIGN PATENT DOCUMENTS

| | | | |
|---|---|---|---|
| WO | 2009-116939 A2 | 9/2009 | |
| WO | 2009-142559 A1 | 11/2009 | |

* cited by examiner

*Primary Examiner* — Rasheed Gidado
(74) *Attorney, Agent, or Firm* — Jefferson IP Law, LLP (57) ABSTRACT

A method for handling an UpLink (UL) resource request in a master Base Station (BS) exchanging data with a plurality of BSs in a communication system is provided. The method includes receiving UL resource request information from at least one slave BS in a cooperative cell, determining scheduled UL resource allocation information indicating information about resources for transmitting UL data, based on the UL resource request information, and delivering the scheduled UL resource allocation information to a Subscriber Station (SS) and the at least one slave BS. The UL resource request information may be generated depending on a UL resource request of the SS.

24 Claims, 11 Drawing Sheets

METHOD AND SYSTEM FOR HANDLING UPLINK RESOURCE REQUEST IN WIRELESS COMMUNICATION SYSTEM

PRIORITY

This application claims the benefit under 35 U.S.C. §119 (a) of a Korean patent application filed on Mar. 15, 2012 in the Korean Intellectual Property Office and assigned Serial No. 10-2012-0026501, the entire disclosure of which is hereby incorporated by reference.

BACKGROUND OF THE INVENTION

1. Field of the Invention

The present invention relates to a wireless communication system. More particularly, the present invention relates to a method and a system for handling an UpLink (UL) resource request signal of a Subscriber Station (SS).

2. Description of the Related Art

Next-generation wireless communication systems consider employing wireless communication systems that use high-frequency bands, such as millimeter Waves (mmW), in order to support high-capacity data services. In a case of a system using high-frequency bands, a Base Station (BS) has a small cell radius due to the short communication distance between a BS and an SS, and an increasing number of BSs are installed to secure the service area of the SS. When the mobility of the SS is considered, the small cell radius of the BS and the increase in the number of BSs may cause an increase in the number of inter-cell handovers of the SS. As a result, the overhead of the system may increase due to the frequent handover of the SS.

In the next-generation wireless communication systems using high-frequency bands, unlike in the wireless communication systems of the related art, a wireless link between an SS and BS is highly likely to fail due to the movement of the SS or the obstacles around the SS.

Therefore, a need exists for a method and a system for handling a UL resource request signal of an SS to provide more efficient services to users and improve reliability of the provided services taking into account characteristics of high-frequency bands to be used in the next-generation wireless communication systems.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and a system for handling an UpLink (UL) resource request of a Subscriber Station (SS) in a cooperative cell-based communication system.

Another aspect of the present invention is to provide a method and a system for efficiently handling a UL resource request of an SS, not only when all Base Stations (BSs) in a cooperative cell may handle services of the SS in cooperation in a cooperative cell-based communication system, but also when a member BS to handle each service of the SS is determined in advance in the cooperative cell.

In accordance with an aspect of the present invention, a method for handling a UL resource request in a master BS exchanging data with a plurality of BSs in a communication system is provided. The method includes receiving UL resource request information from at least one slave BS in a cooperative cell, determining scheduled UL resource allocation information indicating information about resources for transmitting UL data, based on the UL resource request information, and delivering the scheduled UL resource allocation information to an SS and the at least one slave BS. The UL resource request information may be generated depending on a UL resource request of the SS.

In accordance with another aspect of the present invention, a method for handling a UL resource request in at least one slave BS in a cooperative cell in a communication system is provided. The method includes receiving a UL resource request from an SS, generating UL resource request information in response to the UL resource request, transmitting the UL resource request information to a master BS, and upon receiving scheduled UL resource allocation information from the master BS, receiving UL data of the SS depending on the scheduled UL resource allocation information.

In accordance with another aspect of the present invention, a method for handling a UL resource request in an SS exchanging data with a plurality of BSs in a communication system is provided. The method includes sending a UL resource request to at least one slave BS in a cooperative cell, receiving, from a master BS, scheduled UL resource allocation information that is determined based on UL resource request information, and transmitting UL data depending on the scheduled UL resource allocation information. The UL resource request information may be generated by the slave BS in response to the UL resource request.

In accordance with another aspect of the present invention, an apparatus for handling a UL resource request in a master BS exchanging data with a plurality of BSs in a communication system is provided. The apparatus includes a receiver for receiving UL resource request information from at least one slave BS in a cooperative cell, a controller for determining scheduled UL resource allocation information indicating information about resources for transmitting UL data, based on the UL resource request information, and a transmitter for delivering the scheduled UL resource allocation information to an SS and the at least one slave BS. The UL resource request information may be generated depending on a UL resource request of the SS.

In accordance with another aspect of the present invention, an apparatus for handling a UL resource request in at least one slave BS in a cooperative cell in a communication system is provided. The apparatus includes a receiver for receiving a UL resource request from an SS, a controller for generating UL resource request information in response to the UL resource request, and a transmitter for transmitting the UL resource request information to a master BS. Upon receiving scheduled UL resource allocation information from the master BS, the receiver may receive UL data of the SS depending on the scheduled UL resource allocation information.

In accordance with another aspect of the present invention, an apparatus for handling a UL resource request in an SS exchanging data with a plurality of BSs in a communication system is provided. The apparatus includes a transmitter for sending a UL resource request to at least one slave BS in a cooperative cell, a receiver for receiving, from a master BS, scheduled UL resource allocation information that is determined based on UL resource request information, and the transmitter transmits UL data depending on the scheduled UL resource allocation information. The UL resource request information may be generated by the slave BS in response to the UL resource request.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the following description, a master Base Station (BS) may be, for example, a macro BS, and a slave BS may be a small cell, such as a femto cell, a pico cell, a micro cell, a relay, and the like.

Exemplary embodiments of the present invention provide a procedure for handling an UpLink (UL) resource request of a Subscriber Station (SS) in a cooperative cell-based wireless communication system in which a plurality of BSs provide communication services to an SS in cooperation. For a better understanding of exemplary embodiments of the present invention, a UL resource request handling procedure performed in a general wireless communication system will be described first, prior to a description of a UL resource request handling procedure performed in a cooperative cell-based wireless communication system according to exemplary embodiments of the present invention.

Taking into account the characteristics of high-frequency bands to be used in the wireless communication system, a cooperative cell is considered to provide more efficient services to users. The cooperative cell is a virtual cell comprised of a plurality of BSs, which are located around a single SS and provide a service to the SS. The cooperative cell may increase reliability of the links whose power is low in high-frequency bands, as both a master BS and a slave BS(s) serve an SS, and may increase the throughput by providing a plurality of good (or high-power) links to an SS. In addition, the cooperative cell may reduce the delay caused by a handover operation of an SS located on the edge of the cell. In the cooperative cell-based wireless communication system, the SS performs data exchange with multiple BSs (for example, member BSs) belonging to the cooperative cell. Therefore, when roaming around the BSs belonging to the cooperative cell, the SS does not require the handover operation that is normally performed in the general wireless communication system. As a result, the cooperative cell-based wireless communication system may manage the borderless mobility of the SS.

In the wireless communication system using high-frequency bands, since data exchange between an SS and multiple BSs is needed, measures are required to efficiently perform a UL resource request handling procedure needed for UL data exchange between the SS and the multiple BSs.

Figure 1:
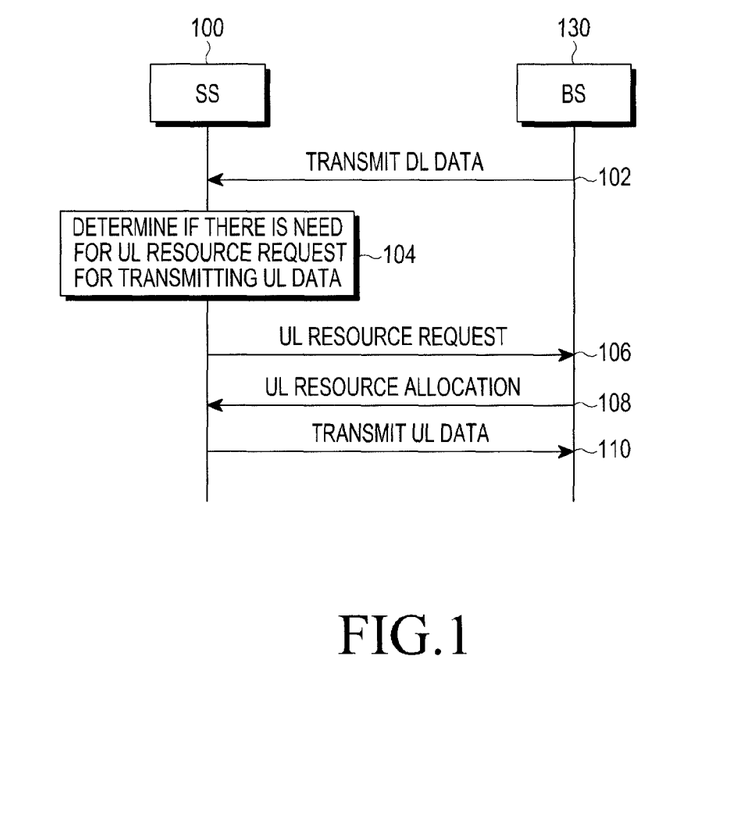
FIG. 1 illustrates a signal flow for handling an UpLink (UL) resource request of a Subscriber Station (SS) in a general communication system according to an exemplary embodiment of the present invention.

FIG. 1 illustrates a signal flow for handling a UL resource request of an SS in a general communication system according to an exemplary embodiment of the present invention.

Referring to FIG. 1, the general wireless communication system includes an SS 100 and an access BS 130.

In step 102, the SS 100 receives a DownLink (DL) data service through the access BS 130. In step 104, the SS 100 generates UL data without UL resources. Therefore, the SS 100 determines if there is a need for UL resources with which it will transmit the UL data to the access BS 130. In step 106, the SS 100 sends a signal indicating a UL resource request to the access BS 130. In step 108, the access BS 130 handles the UL resource request signal received in step 106, and transmits UL resource allocation information to the SS 100. In step 110, the SS 100 transmits the UL data to the access BS 130 using the UL resources allocated in step 108. In the general wireless communication system shown in FIG. 1, the SS 100 performs data exchange with the one access BS 130.

Exemplary embodiments of the present invention provide ways to handle a UL resource request of an SS in a wireless communication system in which multiple BSs form a cooperative cell in cooperation and perform data exchange with the SS in the cooperative cell.

A cooperative cell will now be described, which provides more efficient services to users taking into account the characteristics of high-frequency bands to be used in the wireless communication system to which exemplary embodiments of the present invention are applied. The cooperative cell is a virtual cell comprised of a plurality of BSs, which are located around a single SS and provide a service to the SS, and the cell is assumed to operate, for example, in millimeter Wave (mmW) bands capable of providing broadband services. If the cooperative cell is assumed to include two BSs, one BS, serving as a master BS, allocates resources of the cooperative cell, while the other BS, serving as a slave BS, helps the master BS provide a service to the SS.

Figure 2:
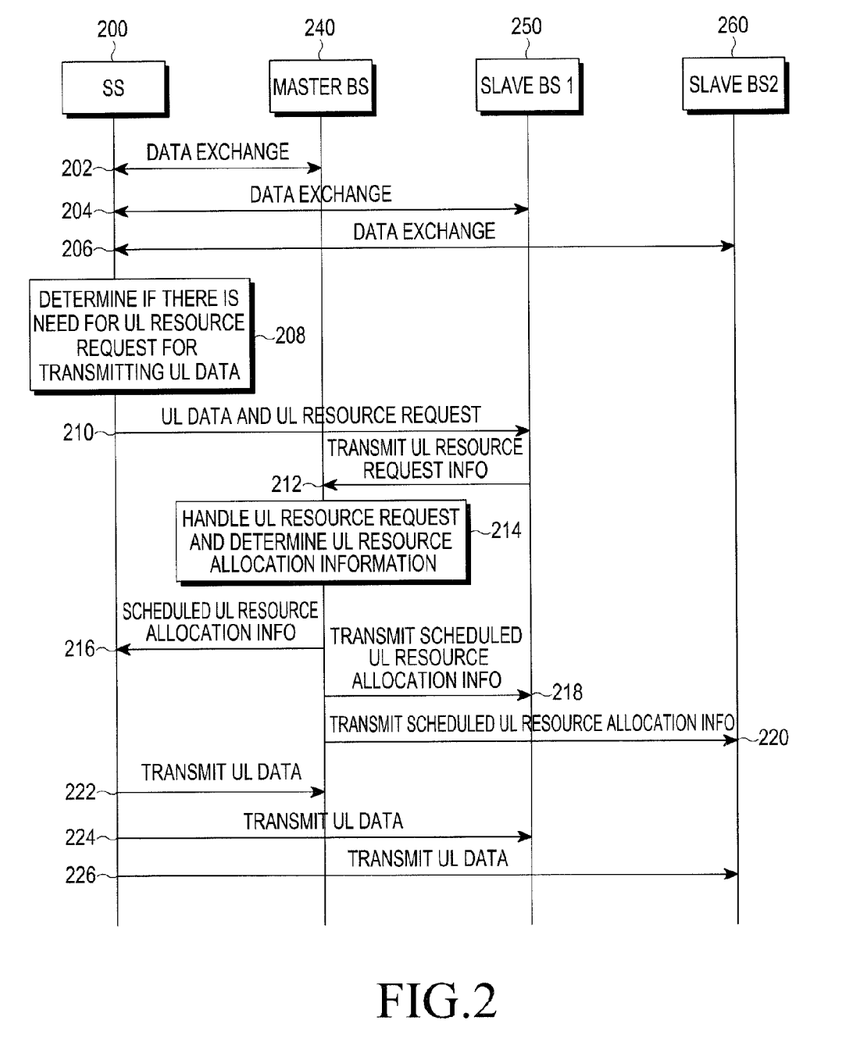
FIG. 2 illustrates a signal flow for handling a UL resource request of an SS in a cooperative cell-based wireless communication system according to a first exemplary embodiment of the present invention.

FIG. 2 illustrates a signal flow for handling a UL resource request of an SS in a cooperative cell-based wireless communication system according to a first exemplary embodiment of the present invention.

Referring to FIG. 2, an SS 200 exchanges UL/DL data with a master BS 240 in step 202. The SS 200 exchanges UL/DL data with a slave BS1 250 and a slave BS2 260 of a cooperative cell in steps 204 and 206, respectively. In step 208, the SS 200 determines if there is a need for a UL resource request for transmitting UL data to the master BS 240, the slave BS1 250 or the slave BS2 260 in the cooperative cell. In step 208, the SS 200 also determines if there is UL data that can carry the UL resource request by piggybacking. The SS 200 is assumed to have UL data to transmit to the slave BS1 250. In step 210, the SS 200 transmits, to the slave BS1 250, the UL data to transmit to the slave BS1 250 and a signal for requesting additional UL resources. In step 212, the slave BS1 250 forwards the UL resource request information transmitted by the SS 200 to the master BS 240. The UL resource request information of the SS 200, which the slave BS1 250 forwards to the master BS 240 in step 212, includes information specified in Table 1 below.

TABLE 1

| UL resource request info | Description |
| --- | --- |
| SS ID | ID of SS that requested UL resources |
| Service ID | ID of service requiring UL resources |
| Amount of UL resource | Amount of UL resources required to transmit UL data |

In step 214, the master BS 240 handles the UL resource request of the SS 200 based on the UL resource request information of the SS 200, which is received in step 212, and determines allocation for UL resources to the SS 200. Step 214 includes a procedure in which the master BS 240 negotiates with the slave BS1 250 and the slave BS2 260 to select a member BS of the cooperative cell, which can satisfy the UL resource request of the SS 200. In step 216, the master BS 240 transmits the UL resource allocation information to the SS 200. The master BS 240 delivers the UL resource allocation information for the SS 200 to the salve BS1 250 and the slave BS2 260 in steps 218 and 220, respectively. In steps 218 and 220, the master BS 240 informs whether UL resources of the slave BS1 250 and the slave BS2 260 are allocated to the SS 200, and provides scheduling information of the allocated UL resources.

Using the UL resources allocated in step 216, the SS 200 transmits the UL data to the master BS 240, the slave BS1 250, or the slave BS2 260 in step 222, 224, or 226, respectively.

Figure 3:
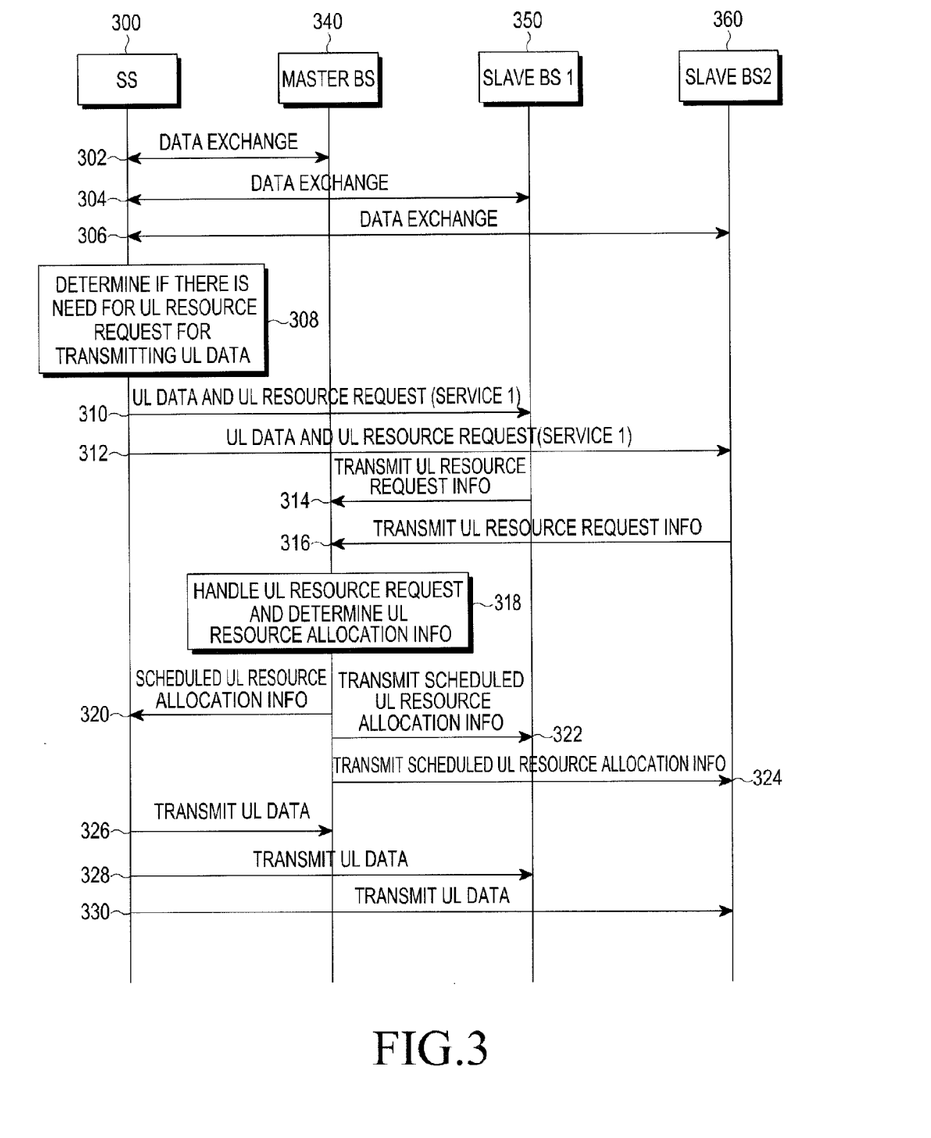
FIG. 3 illustrates a signal flow for handling a UL resource request of an SS in a cooperative cell-based wireless communication system according to a second exemplary embodiment of the present invention.

FIG. 3 illustrates a signal flow for handling a UL resource request of an SS in a cooperative cell-based wireless communication system according to a second exemplary embodiment of the present invention.

Referring to FIG. 3, an SS 300 exchanges UL/DL data with a master BS 340 in step 302. The SS 300 exchanges UL/DL data with a slave BS1 350 and a slave BS2 360 of a cooperative cell in steps 304 and 306, respectively. In step 308, the SS 300 determines if there is a need for a UL resource request for transmitting UL data to the master BS 340, the slave BS1 350 or the slave BS2 360 in the cooperative cell. In step 308, the SS 300 also determines if there is UL data that can carry the UL resource request by piggybacking. The SS 300 is assumed to have UL data to transmit to the slave BS1 350 and the slave BS2 360. In step 310, the SS 300 transmits, to the slave BS1 350, the UL data to transmit to the slave BS1 350 and a signal for requesting additional UL resources. In step 312, the SS 300 also transmits, to the slave BS2 360, the UL data to transmit to the slave BS2 360 and a signal for requesting additional UL resources. The UL resource requests transmitted in steps 310 and 312 are the same resource request information for the same service 1 to which the SS 300 has subscribed. In step 314, the slave BS1 350 forwards the UL resource request information transmitted by the SS 300 to the master BS 340. In step 316, the slave BS2 360 forwards the UL resource request information transmitted by the SS 300 to the master BS 340. The UL resource request information of the SS 300, which the slave BS1 350 and the slave BS2 360 forward to the master BS 340 in step 314 and 316, includes the information specified in Table 1.

In step 318, the master BS 340 handles the UL resource request information of the SS 300, which is received in steps 314 and 316, and determines allocation for UL resources to the SS 300. Step 318 includes a procedure in which the master BS 340 negotiates with the slave BS1 350 and the slave BS2 360 to select a member BS of the cooperative cell, which can satisfy the UL resource request of the SS 300. In step 320, the master BS 340 transmits the UL resource allocation information to the SS 300. The master BS 340 delivers the UL resource allocation information for the SS 300 to the salve BS1 350 and the slave BS2 360 in steps 322 and 324, respectively. In steps 322 and 324, the master BS 340 informs whether UL resources of the slave BS1 350 and the slave BS2 360 are allocated to the SS 300, and provides scheduling information of the allocated UL resources.

Using the UL resources allocated in step 320, the SS 300 transmits the UL data to the master BS 340, the slave BS1 350, or the slave BS2 360 in step 326, 328, or 330, respectively.

Steps 320, 322, and 324 are the same in terms of UL resource allocation information. The UL resource allocation information in steps 320, 322, and 324 is information about the resources for actually transmitting UL data. However, the UL resources allocated by a slave BS1 may be different in position from the UL resources allocated by a slave BS2. The same amount of resources may be allocated, but the detailed parameters, such as Orthogonal Frequency Division Multiple Access (OFDMA) symbol positions and offsets, may be different for each BS. In this case, the master BS needs to provide, to the SS, information about allocation positions in each of slave BSs.

Although a plurality of BSs are assumed to be involved in reception of UL data in FIG. 3, it is not necessary for the master BS and all the slave BSs to simultaneously receive UL data. For example, steps 320 and 322 may transmit the same UL resource allocation data, and step 324 may omit transmitting UL resource allocation information. The same may be applied to all of FIGS. 2 through 12.

In the exemplary embodiments of FIGS. 2 and 3, all BSs in the cooperative cell are assumed to handle the service of the SS in cooperation. However, if a member BS to handle each service of an SS is determined in advance in the cooperative cell-based wireless communication system, only the determined member BS may handle the UL resource request information for the service. Thereafter, a way to handle a UL resource request of an SS in a system, in which a member BS to handle each service of the SS is determined in advance, will be described with reference to FIGS. 4 and 5.

Figure 4:
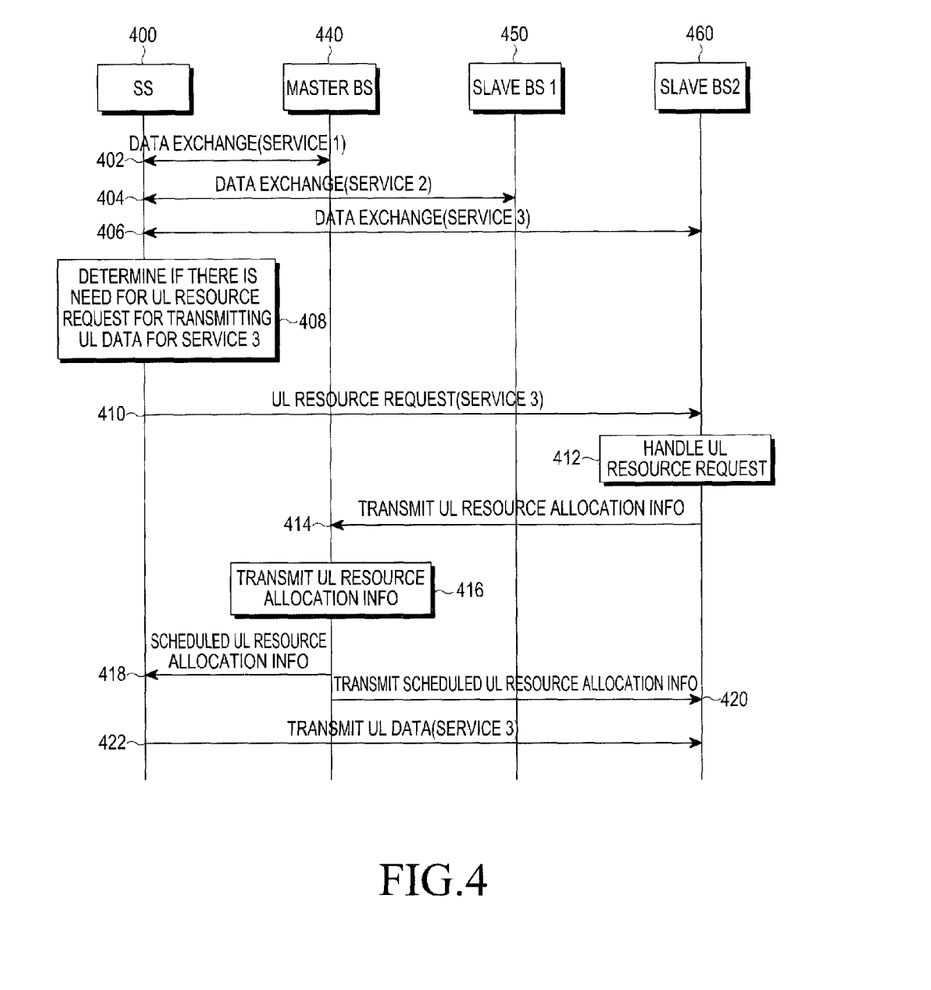
FIG. 4 illustrates a signal flow for handling a UL resource request of an SS in a cooperative cell-based wireless communication system according to a third exemplary embodiment of the present invention.

FIG. 4 illustrates a signal flow for handling a UL resource request of an SS in a cooperative cell-based wireless communication system according to a third exemplary embodiment of the present invention.

Referring to FIG. 4, an SS 400 exchanges UL/DL data with a master BS 440 in step 402. The SS 400 exchanges UL/DL data with a slave BS1 450 and a slave BS2 460 of a cooperative cell in steps 404 and 406, respectively. The SS 400 exchanges UL/DL data for a service 1 with the master BS 440 in step 402, exchanges UL/DL data for a service 2 with the slave BS1 450 in step 404, and exchanges UL/DL data for a service 3 with the slave BS2 460 in step 406. In step 408, the SS 400 determines if there is a need for a UL resource request for transmitting the UL data for the service 3. In step 408, the SS 400 also determines if there is UL data that can carry the UL resource request by piggybacking. The SS 400 is assumed to have UL data to transmit to the slave BS2 460.

In step 410, the SS 400 transmits, to the slave BS2 460, the UL data to transmit to the slave BS2 460 and a signal for requesting additional UL resources. The UL resource request transmitted in step 410 is resource request information for the service 3 to which the SS 400 has subscribed.

In step 412, the slave BS2 460 handles the UL resource request information transmitted by the SS 400. In step 412, the slave BS2 460 configures information (hereinafter referred to as 'UL resource allocation information') about a UL resource area in which the SS 400 will transmit the UL data for the service 3, as defined in Table 2 below.

TABLE 2

| Info about UL resource area | Description |
|---|---|
| SS ID | ID of SS that requested UL resources |
| Service ID | ID of service requiring UL resources |
| UL resource area | Information about of UL resource area (time, frequency, beam, allocation time, and the like) in which SS is to transmit UL data |

In step 414, the slave BS2 460 transmits UL resource allocation information of the SS 400, which includes the information of Table 2, to the master BS 440.

In step 416, the master BS 440 configures UL resource allocation information (for example, scheduling information) to be transmitted to the SS 400, using the UL resource allocation information of the SS 400, which is received in step 414. In step 418, the master BS 440 transmits the UL resource allocation information to the SS 400.

In step 420, the master BS 440 delivers the UL resource allocation information for the SS 400 to the slave BS2 460. In step 420, the master BS 440 informs the slave BS2 460 whether UL resources of the slave BS2 460 are allocated to the SS 400, and provides scheduling information of the allocated UL resources, to the slave BS2 460.

Using the UL resources allocated in step 418, the SS 400 transmits the UL data for the service 3 to the slave BS2 460 in step 422.

Figure 5:
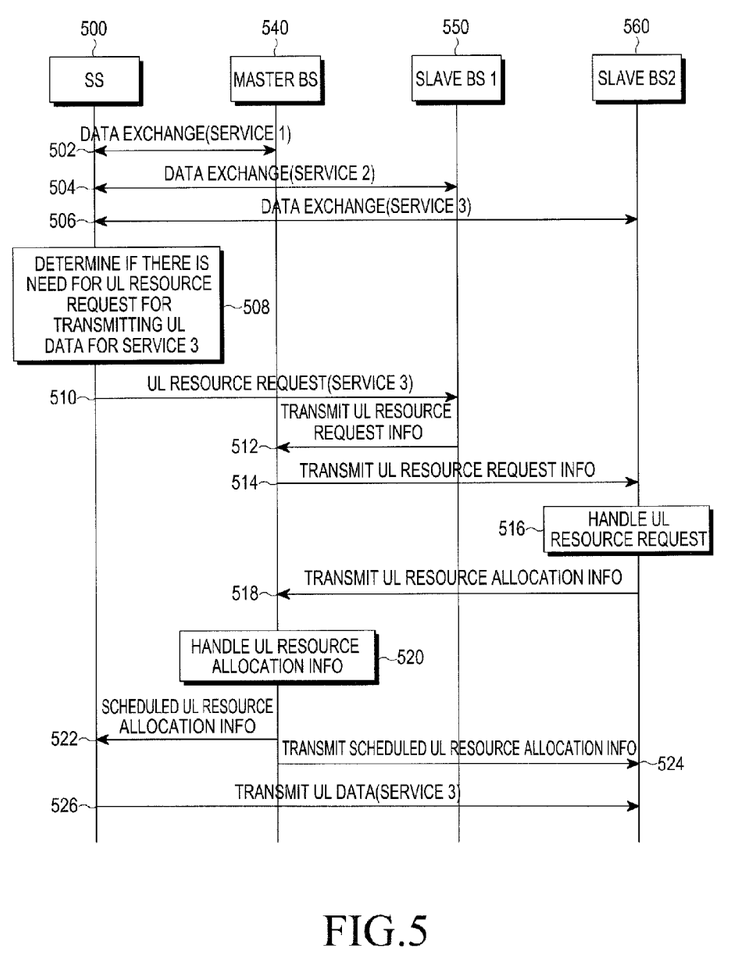
FIG. 5 illustrates a signal flow for handling a UL resource request of an SS in a cooperative cell-based wireless communication system according to a fourth exemplary embodiment of the present invention.

FIG. 5 illustrates a signal flow for handling a UL resource request of an SS in a cooperative cell-based wireless communication system according to a fourth exemplary embodiment of the present invention.

Referring to FIG. 5, an SS 500 exchanges UL/DL data with a master BS 540 in step 502. The SS 500 exchanges UL/DL data with a slave BS1 550 and a slave BS2 560 of a cooperative cell in steps 504 and 506, respectively. The SS 500 exchanges UL/DL data for a service 1 with the master BS 540 in step 502, exchanges UL/DL data for a service 2 with the slave BS1 550 in step 504, and exchanges UL/DL data for a service 3 with the slave BS2 560 in step 506. In step 508, the SS 500 determines if there is a need for a UL resource request for transmitting the UL data for the service 3. In step 508, the SS 500 also determines if there is UL data that can carry the UL resource request by piggybacking. The SS 500 is assumed to have UL data for the service 2 to transmit to the slave BS1 550.

In step 510, the SS 500 transmits, to the slave BS1 550, the UL data to transmit to the slave BS1 550 and a signal for requesting the UL resources for the service 3.

In step 512, the slave BS1 550 forwards the UL resource request of the SS 500 to the master BS 540, determining that the UL resource request signal of the SS 500 corresponds to the service 3 handled in another BS. The information that the slave BS1 550 delivers to the master BS 540 in step 512, includes the information of Table 1.

In step 514, the master BS 540 forwards the UL resource request information of the SS 500, which is received from the slave BS1 550, to the slave BS2 560 in charge of the service 3. The information delivered in step 514 includes the information of Table 1.

In step 516, the slave BS2 560 handles the UL resource request information of the SS 500, which is received through the master BS 540. In step 516, the slave BS2 560 configures information about the UL resource area in which the SS 500 will transmit the UL data for the service 3, as defined in Table 2.

In step 518, the slave BS2 560 transmits the UL resource allocation information of the SS 500, which includes the information of Table 2, to the master BS 540.

In step 520, the master BS 540 configures UL resource allocation information (for example, scheduling information) to be transmitted to the SS 500, using the UL resource allocation information of the SS 500, which is received in step 518. In step 522, the master BS 540 transmits the UL resource allocation information to the SS 500.

In step 524, the master BS 540 delivers the UL resource allocation information for the SS 500 to the slave BS2 560. In step 524, the master BS 540 informs the slave BS2 560 whether the UL resources of the slave BS2 560 are allocated to the SS 500, and provides scheduling information of the allocated UL resources, to the slave BS2 560.

Using the UL resources allocated in step 522, the SS 500 transmits the UL data for the service 3 to the slave BS2 560 in step 526.

In the exemplary embodiment of FIG. 5, the slave BS1 550 is assumed to forward the UL resource request information of the SS 500 for the service 3 to the master BS 540 in step 512. However, if each of the member BSs in the cooperative cell is fully aware in advance of information about the services managed by other member BSs, a certain member BS may directly deliver the UL resource request information of the SS 500 for a specific service to the member BS in charge of the service, without delivering the UL resource request information to the master BS 540.

Figure 6:
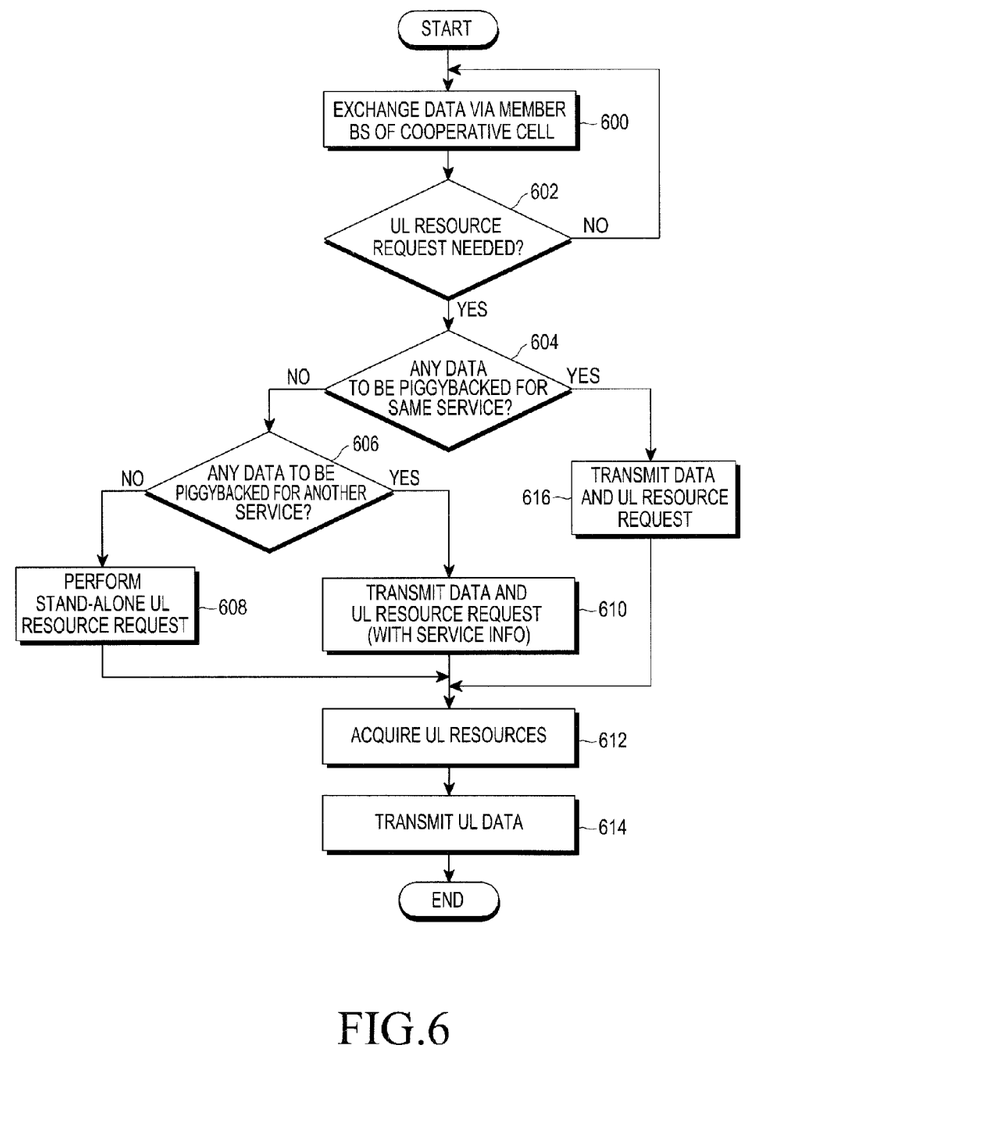
FIG. 6 is a flowchart illustrating an SS's operation of handling a UL resource request in a cooperative cell-based wireless communication system according to an exemplary embodiment of the present invention.

FIG. 6 is a flowchart illustrating an SS's operation of handling a UL resource request in a cooperative cell-based wireless communication system according to an exemplary embodiment of the present invention.

Referring to FIG. 6, the SS exchanges UL/DL data with member BSs in the cooperative cell in step 600. In step 602, the SS determines if there is a need for a UL resource request for transmitting UL data. If it is determined in step 602 that there is a need for a UL resource request, the SS determines in step 604 whether there is UL data to transmit together with the UL resource request. The SS also determines if the service requiring the UL resource request is the same as the service of the UL data to be transmitted now. If it is determined in step 604 that the service requiring the UL resource request is not the same as the service of the UL data to be transmitted now, the SS determines in step 606 whether there is UL data to transmit together with the UL resource request even though the service of the UL data to be transmitted now is not the same as the service requiring the UL resource request. If it is determined in step 606 that there is no UL data to transmit together with the UL resource request, the SS handles the UL resource request by performing a stand-along UL resource request procedure in step 608. In step 612, the SS acquires UL resources in response to the UL resource request of step 608, and transmits the UL data to a member BS in the cooperative cell using the acquired UL resources in step 614.

If it is determined in step 606 that there is UL data to transmit together with the UL resource request and the services correspond to different services, the SS transmits the UL resource request information together with the UL data in step 610. The UL resource request information transmitted in step 610 includes information about the service requiring the UL resources because the services correspond to different services (this case corresponds to FIGS. 2, 3, and 5). The service information includes a service IDentifier (ID) in Table 1 or Table 2. Thereafter, the SS proceeds to step 612.

If it is determined in step 604 that there is UL data to transmit together with the UL resource request and the services correspond to the same services, the SS transmits the UL resource request information together with the UL data in step 616 (this case corresponds to FIG. 4). The UL resource request information transmitted in step 616 does not include information about the service requiring the UL resources. Thereafter, the SS proceeds to step 612.

Figure 7:
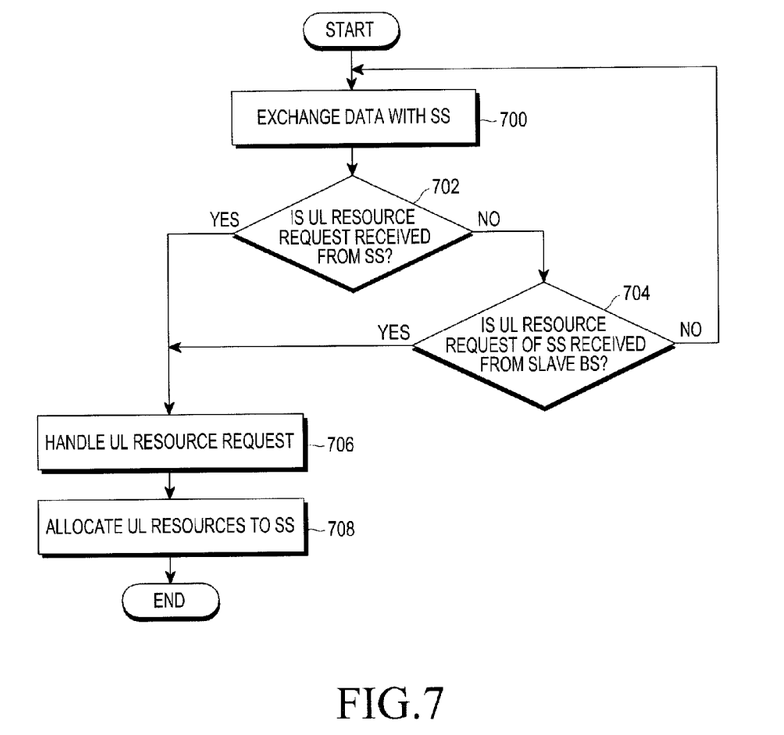
FIG. 7 is a flowchart illustrating a master Base Station's (BS's) operation of handling a UL resource request of an SS in a cooperative cell-based wireless communication system according to the first exemplary embodiment of the present invention.

FIG. 7 is a flowchart illustrating a master BS's operation of handling a UL resource request of an SS in a cooperative cell-based wireless communication system according to the first exemplary embodiment of the present invention.

Referring to FIG. 7, the master BS exchanges UL/DL data with the SS in step 700. In step 702, the master BS determines if the master BS receives a UL resource request from the SS. If it is determined in step 702 that the master BS receives a UL resource request from the SS, the master BS handles the UL resource request of the SS in step 706. In step 706, the master BS identifies information about the service requiring the UL resources requested by the SS, and performs a procedure in which the master BS negotiates the UL resource allocation with a slave BS belonging to the cooperative cell in order to determine whether it can allocate UL resources to the service and to determine the amount of allocable UL resources. Based on the processing results of step 706, the master BS allocates UL resources to the SS in step 708.

If it is determined in step 702 that the master BS receives no UL resource request from the SS, the master BS determines in step 704 whether the master BS receives UL resource request information of the SS from at least one slave BS in the cooperative cell. The UL resource request information of the SS, which is received in step 704, corresponds to the information in Table 1. If it is determined in step 704 that the master BS receives the UL resource request information of the SS through the slave BS, the master BS proceeds to step 706 to handle the UL resource request of the SS. Thereafter, in step 708, the master BS allocates UL resources to the SS (or transmits UL resource allocation information), and delivers the UL resource allocation information for the SS to the slave BS. In other words, the master BS informs the slave BS whether UL resources of the slave BS are allocated to the SS, and provides scheduling information of the allocated UL resources to the slave BS.

Figure 8:
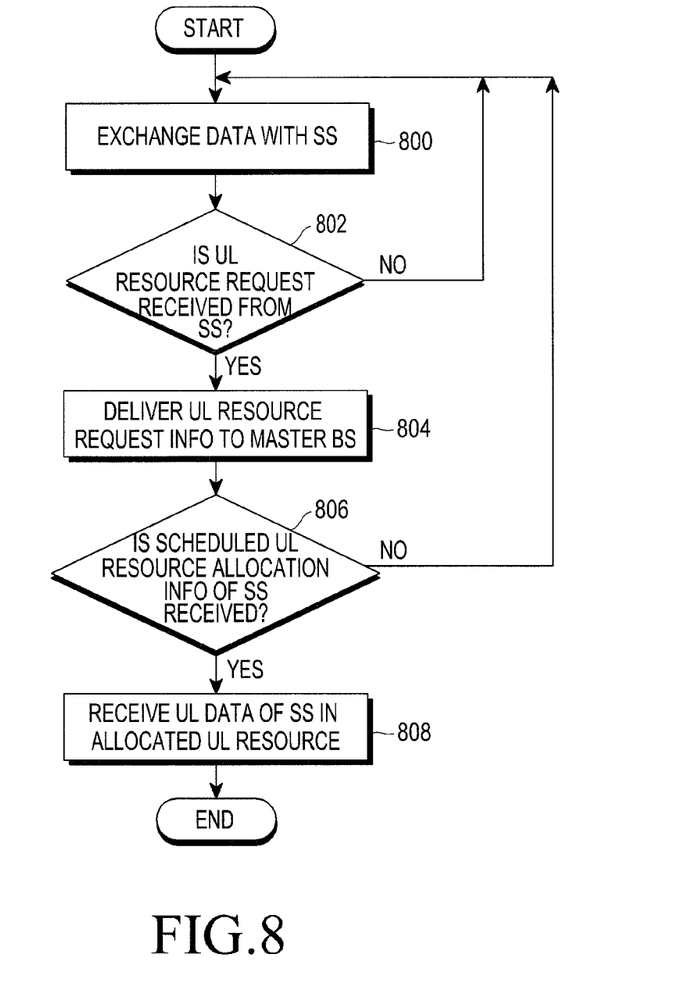
FIG. 8 is a flowchart illustrating a slave BS's operation of handling a UL resource request of an SS in a cooperative cell-based wireless communication system according to the first exemplary embodiment of the present invention.

FIG. 8 is a flowchart illustrating a slave BS's operation of handling a UL resource request of an SS in a cooperative cell-based wireless communication system according to the first exemplary embodiment of the present invention.

Referring to FIG. 8, the slave BS exchanges UL/DL data with the SS in step 800. In step 802, the slave BS determines if the slave BS receives a UL resource request from the SS. If it is determined in step 802 that the slave BS receives a UL resource request from the SS, the slave BS delivers the UL resource request information of the SS to the master BS in step 804. The UL resource request information of the SS, which is delivered to the master BS in step 804, includes the information of Table 1. In step 806, the slave BS determines if the slave BS receives the UL resource allocation information for the SS from the master BS. The UL resource allocation information in step 806 corresponds to the resources allocated to allow the SS to transmit UL data, in the UL resource area of the slave BS. In step 808, the slave BS receives the UL data of the SS in the resource area indicated by the UL resource allocation information of step 806.

The master BS's and slave BS's operation procedures, which are performed when the member BSs in the cooperative cell handle the UL/DL data service of the SS regardless of the service of the SS, have been described so far with reference to FIGS. 7 and 8. Thereafter, the master BS's and slave BS's operation procedures, which are performed when a member BS of a cooperative cell, which is in charge of each service of the SS, is determined, will be described with reference to FIGS. 9 and 10.

Figure 9:
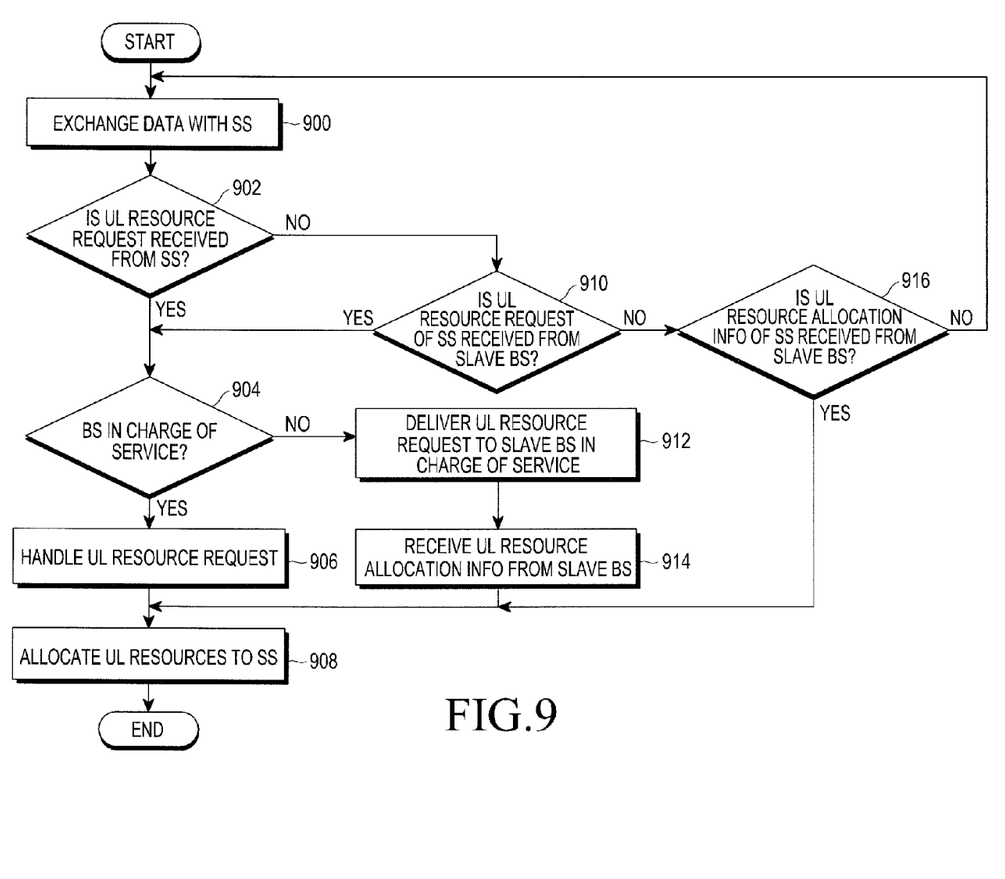
FIG. 9 is a flowchart illustrating a master BS's operation of handling a UL resource request of an SS in a cooperative cell-based wireless communication system according to the second exemplary embodiment of the present invention.

FIG. 9 is a flowchart illustrating a master BS's operation of handling a UL resource request of an SS in a cooperative cell-based wireless communication system according to the second exemplary embodiment of the present invention.

Referring to FIG. 9, the master BS exchanges UL/DL data with the SS in step 900. In step 902, the master BS determines if the master BS receives a UL resource request from the SS. Upon receiving a UL resource request from the SS in step 902, the master BS determines in step 904 whether the service for the UL resource request is a service managed by the master BS. If it is determined in step 904 that the requested service is a service managed by the master BS, the master BS handles the UL resource request of the SS in step 906. In step 906, the master BS determines whether the master BS can allocate the UL resources requested by the SS, and determines the amount of its allocable UL resources. Based on the processing results in step 906, the master BS allocates UL resources to the SS in step 908. In step 908, the master BS determines the amount of UL resources to be allocated to the SS, and transmits scheduling information including information about the area of the UL resources to be allocated.

If it is determined in step 904 that the requested service is not the service managed by the master BS, the master BS delivers UL resource request information of the SS to a slave BS in charge of the service corresponding to the UL resource request, in step 912. The UL resource request information in step 912 includes the information of Table 1. In step 914, the master BS receives allocation information for the UL resource request of the SS from the slave BS in charge of the service corresponding to the UL resource request. The UL resource allocation information received in step 914 includes the information of Table 2. Using the UL resource allocation information received in step 914, the master BS transmits scheduling information indicating UL resource allocation to the SS in step 908.

If it is determined in step 902 that the master BS receives no UL resource request from the SS, the master BS determines in step 910 whether the master BS receives UL resource request information of the SS from a slave BS in the cooperative cell. The UL resource request information of the SS, which is received in step 910, corresponds to the information in Table 1. If it is determined in step 910 that the master BS has received the UL resource request information of the SS via the slave BS, the master BS proceeds to step 904.

If it is determined in step 910 that the master BS receives no UL resource request information of the SS, which is specified in Table 1, via the slave BS, the master BS determines in step 916 whether the master BS receives UL resource allocation information of the SS from the slave BS in the cooperative cell. The UL resource allocation information of the SS, which is received in step 916, corresponds to the information in Table 2. If it is determined in step 916 that the master BS has received UL resource allocation information of the SS via the slave BS, the master BS proceeds to step 908. However, if it is determined in step 916 that the master BS receives no UL resource request of the SS or receives no UL resource allocation information of the SS via the slave BS, the master BS returns to step 900.

Figure 10:
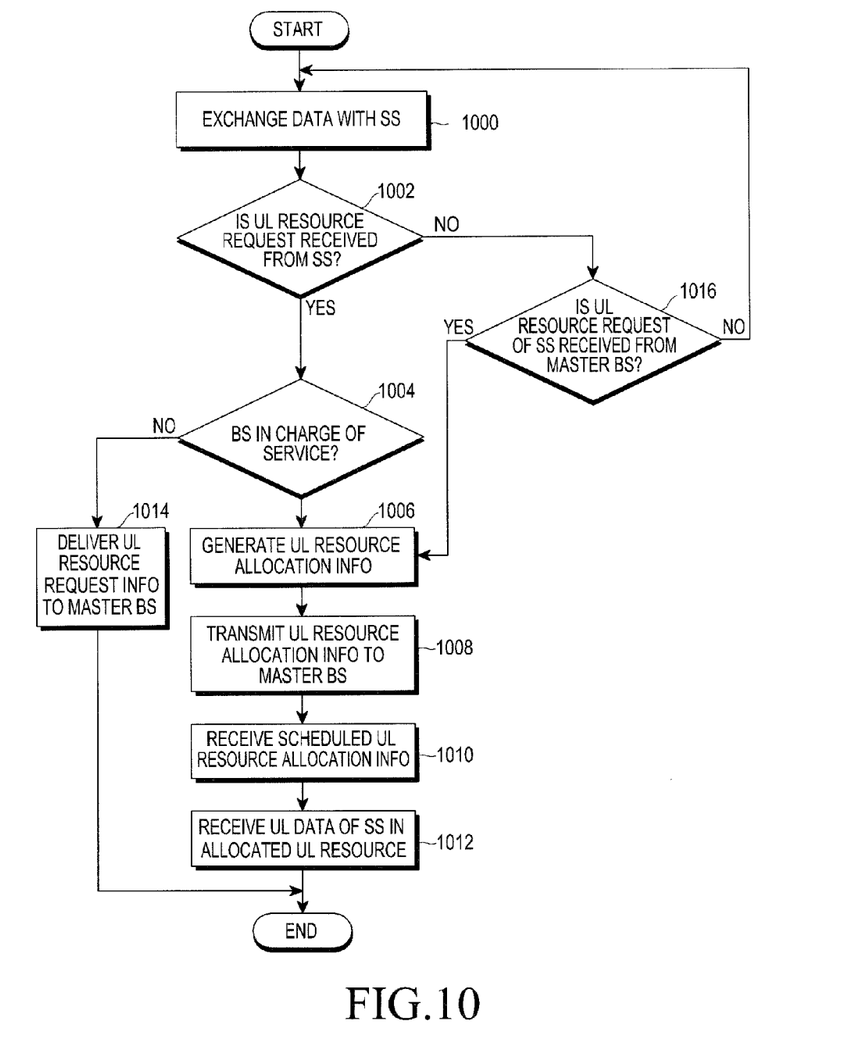
FIG. 10 is a flowchart illustrating a slave BS's operation of handling a UL resource request of an SS in a cooperative cell-based wireless communication system according to the second exemplary embodiment of the present invention.

FIG. 10 is a flowchart illustrating a slave BS's operation of handling a UL resource request of an SS in a cooperative cell-based wireless communication system according to the second exemplary embodiment of the present invention.

Referring to FIG. 10, the slave BS exchanges UL/DL data with the SS in step 1000. In step 1002, the slave BS determines if the slave BS receives a UL resource request from the SS. If it is determined in step 1002 that the slave BS receives a UL resource request from the SS, the slave BS determines in step 1004 whether the service for the UL resource request is a service managed by the slave BS. If it is determined in step 1004 that the requested service corresponds to the service managed by the slave BS, the slave BS handles the UL resource quest of the SS and generates information about the UL resources allocated to the SS, in step 1006. In step 1006, the slave BS determines whether the slave BS can allocate UL resources requested by the SS, and determines the amount of its allocable UL resources. The information about the UL resources allocated by the slave BS includes the information in Table 2. In step 1008, the slave BS transmits UL resource allocation information for the SS to the master BS. In step 1010, the slave BS receives scheduling information used for receiving UL data from the SS, from the master BS. The UL data scheduling information in step 1010 is configured based on the UL resource allocation information of the SS, which the slave BS transmitted in step 1008. In step 1012, the slave BS receives UL data from the SS in the area indicated by the UL data scheduling information of step 1010.

If it is determined in step 1004 that the slave BS is not a BS in charge of the service, the slave BS forwards the UL resource request information of the SS to the master BS in step 1014. The UL resource request information of the SS, which is delivered to the master BS in step 1014, includes the information of Table 1.

In step 1016, the slave BS determines if the slave BS receives a UL resource request of the SS from the master BS. If it is determined in step 1016 that the slave BS receives a UL resource request of the SS, the slave BS performs a procedure for handling the UL resource request of the SS in step 1006. Although the slave BS is assumed to receive the UL resource request of the SS from the master BS in step 1016, the slave BS may also receive the UL resource request of the SS from another slave BS in the cooperative cell.

Figure 11:
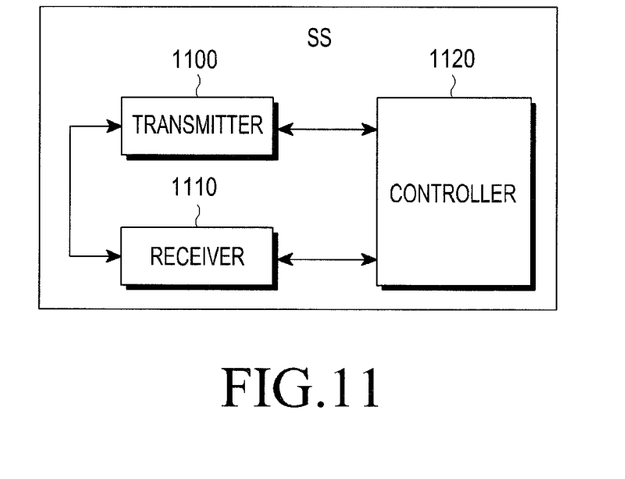
FIG. 11 illustrates a structure of an SS in a communication system according to an exemplary embodiment of the present invention.

FIG. 11 illustrates a structure of an SS in a communication system according to an exemplary embodiment of the present invention.

Referring to FIG. 11, the SS includes a transmitter 1100, a receiver 1110 and a controller 1120.

The transmitter 1100 and the receiver 1110 include a transmitting module and a receiving module for transmitting and receiving data to/from a BS, respectively, in the communication system according to an exemplary embodiment of the present invention. The BS includes a master BS or a slave BS.

The controller 1120 requests UL resources of the SS by accessing a master BS or a slave BS in accordance with the procedure described in conjunction with FIGS. 2 through 10, and transmits UL data of the SS to the master BS or the slave BS using the resources allocated by the master BS.

Figure 12:
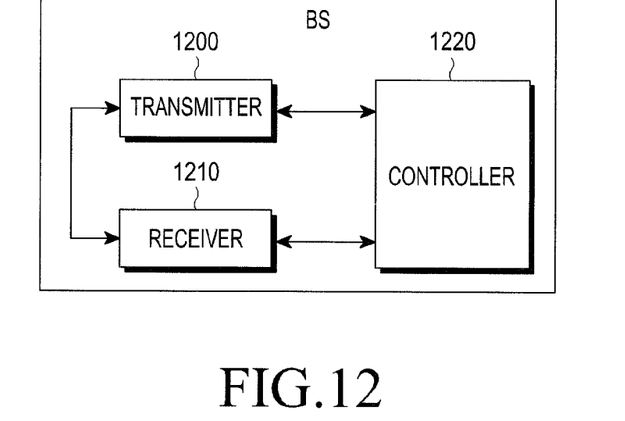
FIG. 12 illustrates a structure of a BS in a communication system according to an exemplary embodiment of the present invention.

FIG. 12 illustrates a structure of a BS in a communication system according to an exemplary embodiment of the present invention. The above-described master BS and slave BS may be implemented in the structure of FIG. 12.

Referring to FIG. 12, the BS includes a transmitter 1200, a receiver 1210, and a controller 1220.

The transmitter 1200 and the receiver 1210 include a transmitting module and a receiving module for transmitting and receiving data to/from an SS, respectively, in the communication system according to an exemplary embodiment of the present invention. If the BS is a master BS, the transmitter 1200 and the receiver 1210 include a transmitting module and a receiving module for transmitting and receiving data to/from a slave BS, respectively. If the BS is a slave BS, the transmitter 1200 and the receiver 1210 include a transmitting module and a receiving module for transmitting and receiving data to/from the master BS or another slave BS, respectively.

In accordance with an exemplary embodiment of the present invention, if the BS is a master BS, the controller 1220 determines to allocate the UL resources to an SS by handling the UL resource request information (corresponding to Table 1) as described in conjunction with FIGS. 2, 3, and 5.

In accordance with another exemplary embodiment of the present invention, if the BS is a master BS, the controller 1220 determines to allocate the UL resources to an SS by handling information (corresponding to Table 2) about the UL resource area, which is transmitted from a slave BS, as described in conjunction with FIGS. 4 and 5.

In accordance with another exemplary embodiment of the present invention, if the BS is a slave BS, the controller 1220 generates UL resource request information (corresponding to Table 1) upon receiving a UL resource request from the SS and transmits it to the master BS, as described in conjunction with FIGS. 2 and 3.

In accordance with another exemplary embodiment of the present invention, in a case where the BS is a slave BS, as described with FIGS. 4 and 5, the controller 1220 generates and handles information about UL resource area, which is as defined in Table 2, if the service requested by the SS is the same as the service provided by the slave BS, and the controller 1220 forwards the UL resource request received from the SS to the slave BS that handles the same service as the service requested by the SS, if the requested service is not the same service as the service provided by the slave BS.

The method and the system according to exemplary embodiments of the present invention may be implemented as computer-readable codes in computer-readable recording media. The computer-readable recording media include all kinds of recording devices for storing data which can be read by the computer system. Examples of the recording media include a Read Only Memory (ROM), a Random Access Memory (RAM), a Compact Disk ROM (CD-ROM), magnetic tapes, floppy disks, optical data storage devices, and the like, and may also include media which are implemented in the form of carrier waves (for example, transmission over the Internet).

As is apparent from the foregoing description, exemplary embodiments of the present invention provide ways to handle a UL resource request, which is received together with UL data of an SS, in a cooperative cell-based wireless communication system supporting data exchange between one SS and multiple BSs serving the SS, thereby making it possible to efficiently manage resources between an SS and multiple BSs serving the SS in the cooperative cell-based wireless communication system.

Exemplary embodiments of the present invention provide ways to efficiently handle a UL resource request of an SS, not only when all BSs in a cooperative cell may handle services of the SS in cooperation in a cooperative cell-based communication system, but also when a member BS to handle each service of the SS is determined in advance in the cooperative cell.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for handling an uplink (UL) resource request in a master base station (BS) exchanging data with a plurality of BSs in a communication system, the method comprising:
   receiving UL resource request information from at least one slave BS that is determined for each service of a mobile station (MS);
   determining scheduled UL resource allocation information indicating information about resources for transmitting UL data, based on the UL resource request information; and
   transmitting the determined UL resource allocation information to the MS and the at least one slave BS,
   wherein the UL resource request information is generated depending on a UL resource request of the MS; and
   wherein the UL resource allocation information includes information about a UL resource area in which the MS is to transmit UL data.

2. The method of claim 1, wherein the UL resource allocation information includes at least one of:
   an identifier of an MS that requested UL resources; and
   an identifier of a service requiring UL resources.

3. The method of claim 2, wherein the UL resource allocation information is generated depending on the UL resource request of the MS.

4. The method of claim 2, wherein the UL resource allocation information is generated depending on the UL resource request information.

5. A method for handling an uplink (UL) resource request in at least one slave base station (BS) in a cooperative cell in a communication system, the method comprising:
   generating UL resource request information by at least one slave BS that is determined for each service of a mobile station (MS);
   transmitting the UL resource request information to a master BS; and
   upon receiving scheduled UL resource allocation information from the master BS, receiving UL data of the MS depending on the scheduled UL resource allocation information,
   wherein the UL resource request information is generated depending on a UL resource request of the MS; and
   wherein the UL resource allocation information includes information about a UL resource area in which the MS is to transmit UL data.

6. The method of claim 5, wherein the UL resource allocation information includes at least one of:
   an identifier of an MS that requested UL resources; and
   an identifier of a service requiring UL resources.

7. The method of claim 6, wherein the UL resource allocation information is generated depending on the UL resource request of the MS.

8. The method of claim 6, wherein the UL resource allocation information is generated depending on the UL resource request information.

9. A method for handling an uplink (UL) resource request in a mobile station (MS) exchanging data with a plurality of base stations (BSs) in a communication system, the method comprising:
   transmitting a UL resource request to at least one slave BS that is determined for each service of the MS;
   receiving, from a master BS, scheduled UL resource allocation information that is determined based on UL resource allocation information; and
   transmitting UL data depending on the scheduled UL resource allocation information, wherein the scheduled UL resource allocation information is information that is scheduled by the master BS based on UL resource allocation information received from the at least one slave BS;

wherein the UL resource request information is generated depending on a UL resource request of the MS; and wherein the UL resource allocation information includes information about a UL resource area in which the MS is to transmit UL data.

10. The method of claim 9, wherein the UL resource allocation information includes at least one of:
an identifier of an MS that requested UL resources;
an identifier of a service requiring UL resources.

11. The method of claim 10, wherein the UL resource allocation information is generated depending on the UL resource request of the MS.

12. The method of claim 10, wherein the UL resource allocation information is generated depending on the UL resource request information.

13. An apparatus for handling an uplink (UL) resource request in a master base station (BS) exchanging data with a plurality of BSs in a communication system, the apparatus comprising:
a receiver configured to receive UL resource request information from at least one slave BS that is determined for each service of a mobile station (MS);
a controller configured to determine scheduled UL resource allocation information indicating information about resources for transmitting UL data, based on the UL resource request information; and
a transmitter configured to transmit the determined UL resource allocation information to the MS and the at least one slave BS,
wherein the UL resource request information is generated depending on a UL resource request of the MS; and
wherein the UL resource allocation information includes information about a UL resource area in which the MS is to transmit UL data.

14. The apparatus of claim 13, wherein the UL resource allocation information includes at least one of:
an identifier of an MS that requested UL resources;
an identifier of a service requiring UL resources.

15. The apparatus of claim 14, wherein the UL resource allocation information is generated depending on the UL resource request of the MS.

16. The apparatus of claim 14, wherein the UL resource allocation information is generated depending on the UL resource request information.

17. An apparatus for handling an uplink (UL) resource request in at least one slave base station (BS) in a cooperative cell in a communication system, the apparatus comprising:
a controller configured to generate UL resource request information by at least one slave BS that is determined for each service of a mobile station (MS);
a transmitter configured to transmit the UL resource request information to a master BS, and
a receiver configured to receive, upon receiving scheduled UL resource allocation information from the master BS, UL data of the MS depending on the scheduled UL resource allocation information,
wherein the UL resource request information is generated depending on a UL resource request of the MS; and
wherein the UL resource allocation information includes information about a UL resource area in which the MS is to transmit UL data.

18. The apparatus of claim 17, wherein the UL resource allocation information includes at least one of:
an identifier of an MS that requested UL resources;
an identifier of a service requiring UL resources.

19. The apparatus of claim 18, wherein the UL resource allocation information is generated depending on the UL resource request of the MS.

20. The apparatus of claim 18, wherein the UL resource allocation information is generated depending on the UL resource request information.

21. An apparatus for handling an uplink (UL) resource request in a mobile station (MS) exchanging data with a plurality of base stations (BSs) in a communication system, the apparatus comprising:
a transmitter configured to transmit a UL resource request to at least one slave BS that is determined for each service of the MS; and
a receiver configured to receive, from the master BS, scheduled UL resource allocation information that is determined based on UL resource allocation information,
wherein the transmitter is further configured to transmit UL data depending on the scheduled UL resource allocation information, and
wherein the scheduled UL resource allocation information is information that is scheduled by the master BS based on UL resource allocation information received from the at least one slave BS,
wherein the UL resource request information is generated depending on a UL resource request of the MS; and
wherein the resource allocation information includes information about a UL resource area in which the MS is to transmit UL data.

22. The apparatus of claim 21, wherein the UL resource allocation information includes at least one of:
an identifier of an MS that requested UL resources;
an identifier of a service requiring UL resources.

23. The apparatus of claim 22, wherein the UL resource allocation information is generated depending on the UL resource request of the MS.

24. The apparatus of claim 22, wherein the UL resource allocation information is generated depending on the UL resource request information.

* * * * *